Nov. 10, 1970  E. A. WUNSCH  3,538,780

VARIABLE DIRECTION TRANSMISSION

Filed March 18, 1968  3 Sheets-Sheet 1

INVENTOR.

Erich Anton Wunsch

BY *Will, Sherman, Meroni, Gross Simpson*  ATTORNEYS

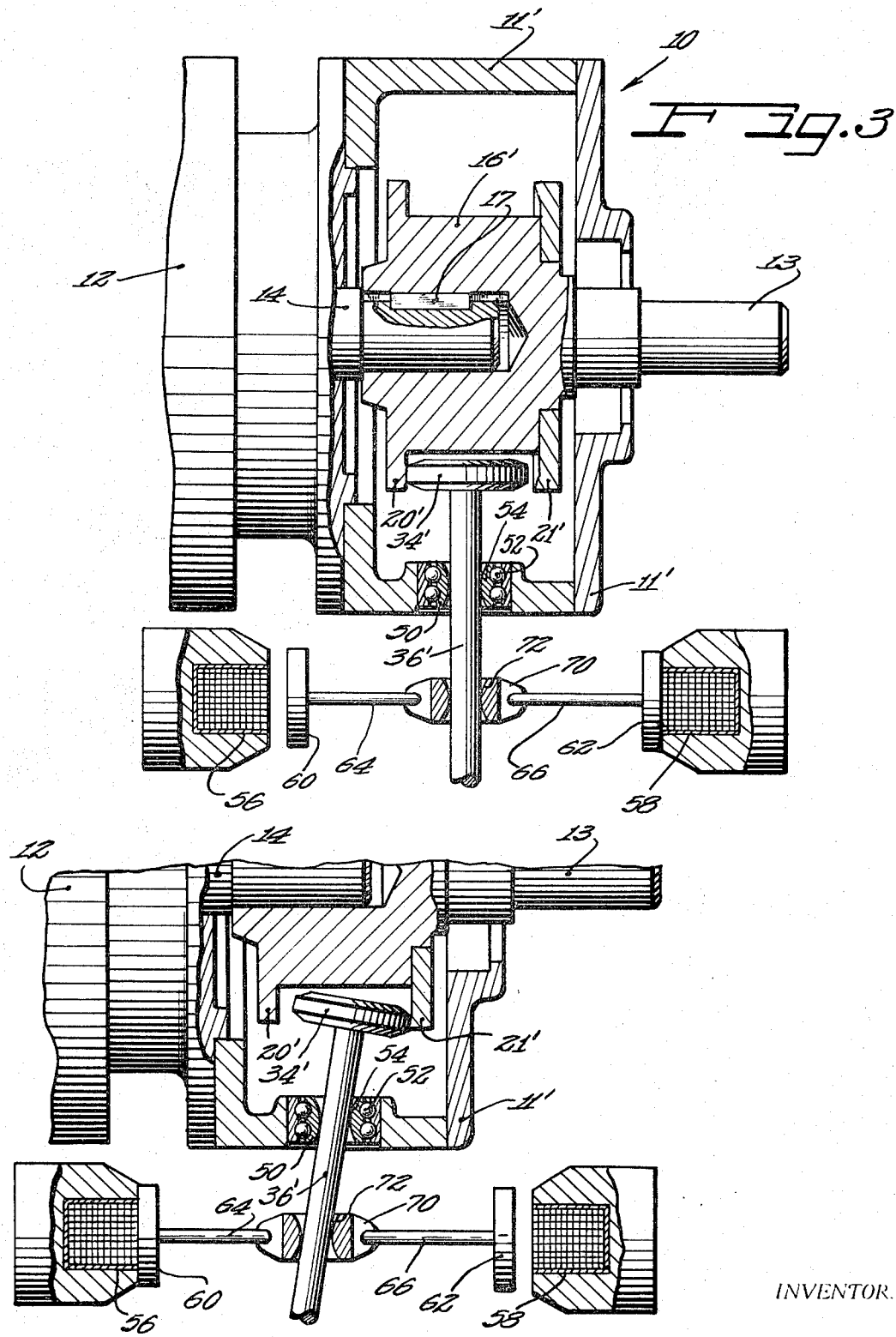

Nov. 10, 1970 — E. A. WUNSCH — 3,538,780
VARIABLE DIRECTION TRANSMISSION
Filed March 18, 1968 — 3 Sheets-Sheet 3
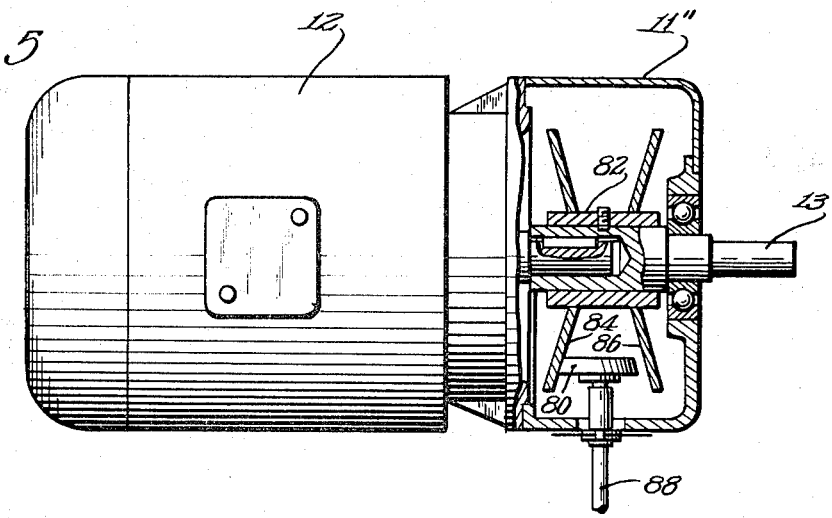
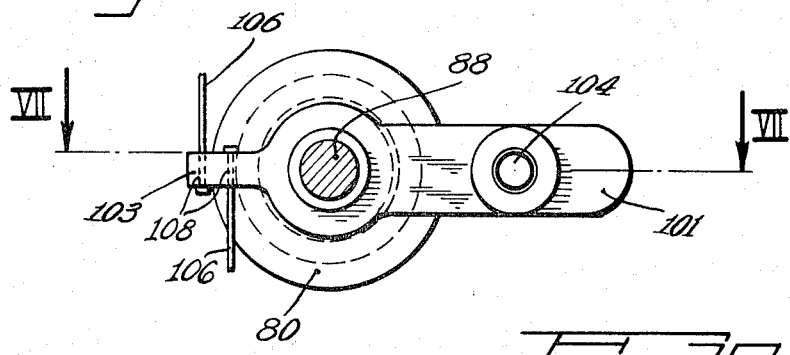
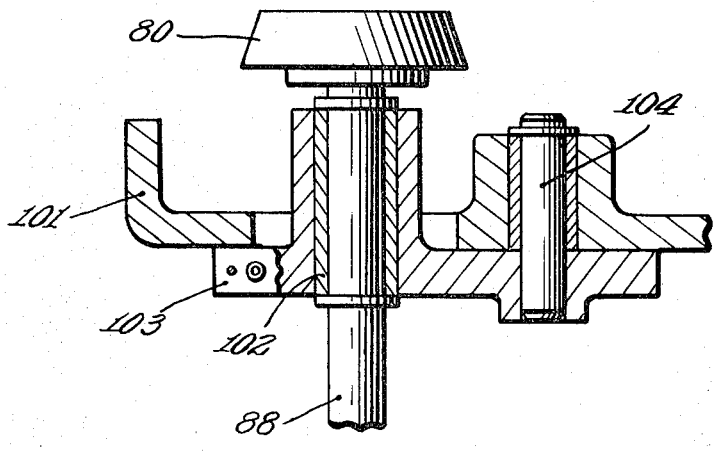
INVENTOR
Erich Anton Wunsch
ATTORNEYS United States Patent Office 3,538,780
Patented Nov. 10, 1970

3,538,780
VARIABLE DIRECTION TRANSMISSION
Erich Anton Wunsch, Im Hofrain, Germany, assignor to
Friedgard Wunsch, Im Hofrain, Germany
Filed Mar. 18, 1968, Ser. No. 713,939
Claims priority, application Germany, Sept. 27, 1967,
W 44,860; Dec. 30, 1967, W 45,442
Int. Cl. F16h 13/12, 15/10
U.S. Cl. 74—202                                3 Claims

ABSTRACT OF THE DISCLOSURE

An electromechanical take-off drive device including an axially slidable wheel mounted on a drive shaft, a plurality of annular electromagnets to control the axial movement of the wheel, and a friction wheel operatively disposed with respect to the wheel to be driven at varying speeds bidirectionally with a constant drive shaft rotational speed.

BACKGROUND OF THE INVENTION

This invention pertains to a variable direction transmission, and more particularly to a device for taking off an auxiliary drive from a rotating shaft.

PRIOR ART

It is known to use a take off from a shaft for controlling chain or V-belt drives over clutches, special additional gears or controls with relay switches and the like. An auxiliary drive may also be used to connect additional units of work. These devices have been complicated and cumbersome as well as costly.

SUMMARY

In accordance with the present invention, there is provided a wheel having a pair of annular side walls which is axially movable on a drive shaft, a plurality of electromagnets are disposed axially from the side walls to control the axial movement of the wheel. A friction wheel is disposed in the annular interspace between the side walls and is engaged by one or the other side wall when the electromagnets at one or the other side are energized. The friction wheel is movable along the annular side walls to provide a variable speed for the take-off shaft. The wheel is biased into a central position which is out of contact with the friction wheel by a pair of springs. In addition, the invention includes the method of taking off an auxiliary drive.

Accordingly, it is an object of the present invention to provide an electromechanical variable direction and variable speed apparatus. Another object of the present invention is to provide an electromechanical take-off apparatus which is adjustable without the necessity of stopping the rotating main drive shaft.

A further object of the present invention is to provide an electromechanical take-off method and apparatus which is simple, requires a minimum amount of space, and is reliable.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawings:

FIG. 3 and FIG. 4 are similar to FIGS. 1 and 2 and illustrate an alternative embodiment of the present invention;

FIG. 5 is an axial sectional view of a further alternative embodiment of the present invention;

FIG. 6 is an enlarged bottom view of the take-off apparatus of FIG. 5; and

FIG. 7 is a sectional view of the take-off apparatus along the line VII—VII of FIG. 6.

As shown on the drawings:

Figure 1:
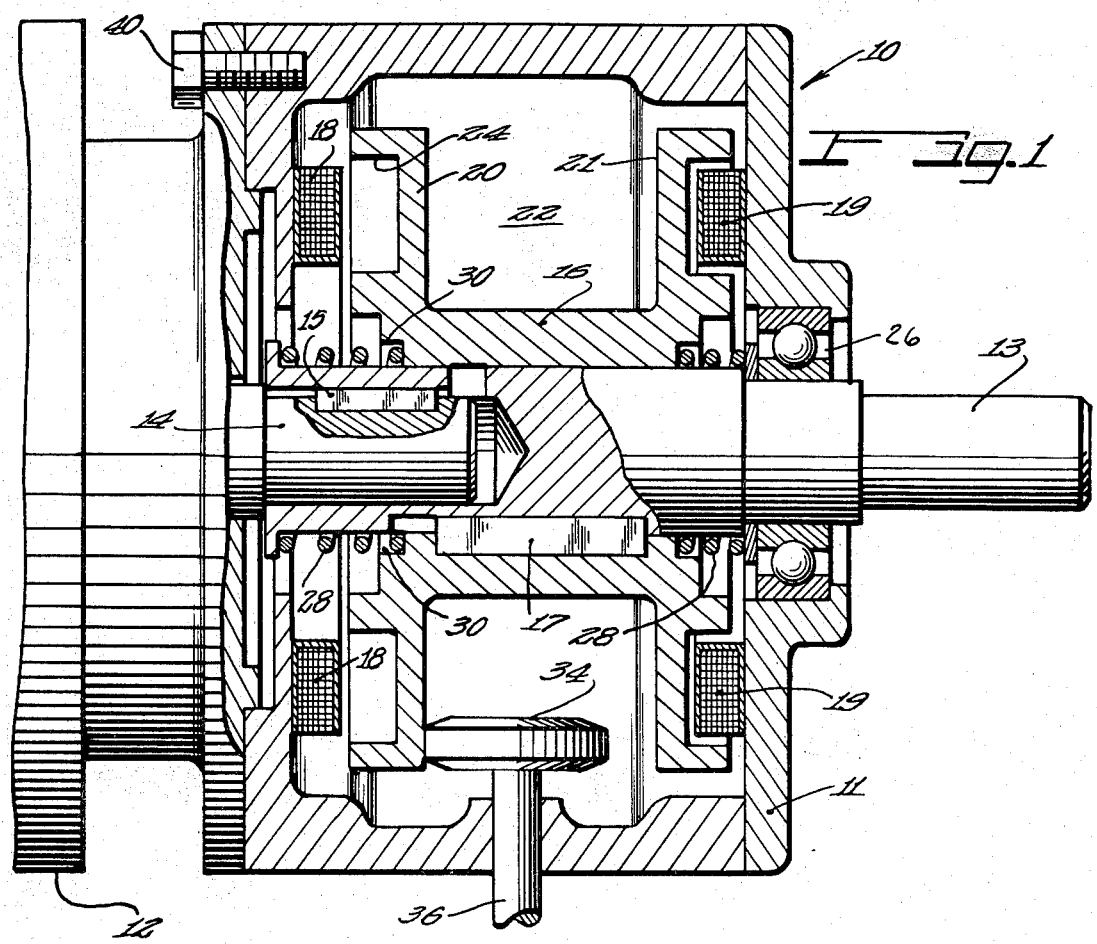
FIG. 1 is an axial sectional view of the take-off apparatus.
Figure 2:
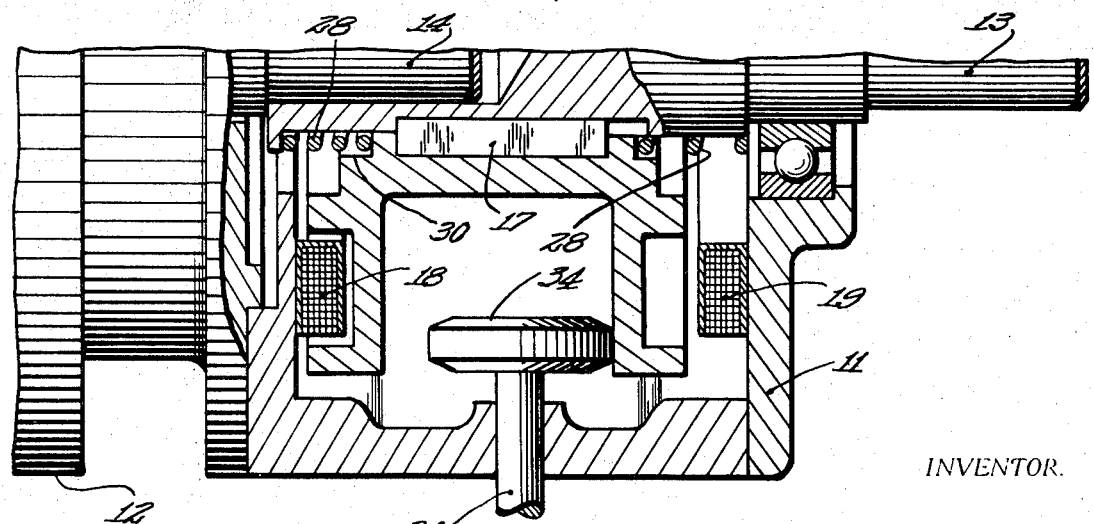
FIG. 2 is an enlarged partial axial view similar to FIG. 1 illustrating a second drive position.

The principles of this invention are particularly useful when embodied in an electromechanical actuation apparatus as illustrated in FIG. 1, generally indicated by the numeral 10. The apparatus includes a housing 11 which is secured to a motor 12 with a shaft 13 mounted on the motor shaft 14 by a key 15. The shaft 13 rotates concentrically with the motor shaft 14. Mounted on the shaft 13 is a slidable wheel 16 which is secured for rotation by a key 17.

Within the housing 11 are a plurality of annular electromagnets 18 and 19 disposed on either side of the wheel 16 which has annular side walls 20 and 21 defining an annular interspace 22. The annular electromagnets 18 and 19 are disposed to fit in a pair of annular grooves 24 in each of the side walls 20 and 21. The shaft 13 is supported by a set of ball bearings 26 in the end wall of the housing 11.

Concentric with the shaft 13 are a pair of springs 28 disposed on each side of the wheel 16 and abutting the end walls of the housing 11. The springs 28 abut the axial portion of the wheel 16 in a radial cutout 30. The springs 28 bias the wheel 16 in a central position on the shaft 13.

In the interspace 22, there is disposed a friction wheel 34 mounted on an auxiliary shaft 36 which passes to the wall of the housing 11.

In its central position, the wheel 16 is out of contact with the friction wheel 34. With the right annular magnet 19 energized, the wheel 16 is attracted to the right and the magnet 19 fits within the annular groove 24. The left side wall 20 is urged against the friction wheel 34 and causes the auxiliary shaft 36 to rotate. Similarly, when the left electromagnet 18 is energized, the friction wheel 34 is engaged by the right side wall 21 and is caused to rotate in the opposite direction. When the electromagnets are deenergized, the wheel 16 returns to its central position, the side walls 20, 21 are out of engagement with the friction wheel 34 and the auxiliary shaft 36 is not caused to rotate.

Thus, the wheel 16 is axially displaceable to the left or to the right through the electromagnets 18 and 19 disposed on either side of the wheel 16. The annular side walls 20 and 21 are urged against the friction wheel 34. More than one friction wheel 34 and auxiliary drive 36 may be provided to be driven by the wheel 16.

In operation, when one of the annular magnets 18 or 19 is energized, the wheel 16 is displaced in an axial direction towards the energized magnet. One of the side wheel 20 or 21 is thereby caused to be urged against the friction wheel 34 and cause rotation thereby. The auxiliary shaft 36 is made to rotate in one direction from the rest position. When the other magnet, for example, 19 is energized, FIG. 1, the side wall 20 of the wheel 16 is urged against the friction wheel so as to rotate the auxiliary shaft 36 in the reverse direction.

The auxiliary take-off apparatus 10 is secured by a bolt 40 or the like to the motor 12. The shaft 13 may be driven at a constant speed by the motor shaft 14, or if desired at varying speeds. By adjusting the position of the friction wheel 34 in the radial direction with respect to the side walls 20 and 21, the periphery velocity of the side wall relative to the friction wheel is adjusted to effect a change in the number of revolutions of the shaft 13 to the number of revolutions of the friction wheel 34, and differences in numbers of revolutions can be balanced. Moreover, the shaft 13 may rotate in the same or in a reverse direction of rotation as it is only necessary to bring the alternate side wall of the wheel 16 into abutting relation with the friction wheel to achieve the desired direction of rotation for the auxiliary shaft 36.

The take-off apparatus 10 requires a minimum of space. The auxiliary shaft 36 can be utilized for a wide variety of purposes, for example, with a conventional gear ratio for the control of belt or chain drives; other controlling or regulating actions as the need arises. The auxiliary drive 36 can also be used for driving additional units of work, for example, driving grinding wheels. Finally, a high number of revolutions of the auxiliary shaft 36 can be achieved making it more controllable. The invention can be used in a variety of ways despite its simple construction and has particularly suitable and economical means for controlling or producing any mechanical or electrical operation, either manually or according to a controlled program, directly or indirectly.

The method of taking off an auxiliary drive includes driving the wheel 16 with the motor 12, controlling the axial position of the wheel 16 with the electromagnets 18 and 19, and engaging the friction wheel 34 mounted on the take-off drive shaft 36 with the side walls 20 and 21 depending on the energization of the electromagnets 18 or 19 to cause the take-off drive shaft to rotate in either direction. The method further includes varying the distance of the friction wheel from the hub of the wheel 16 to vary the rotational speed of the take-off shaft while the wheel is being rotated at a constant rate.

A modified wheel 16', FIG. 3, may be used in the invention. The auxiliary shaft 36' passes through an adjustable aperture 50 having two sets of ball bearings 52 supporting a convex ring 54. The shaft 36' is canted to the left or right, FIG. 4, under the control of a pair of electromagnets 56 and 58 which act on a left and right magnet member 60 and 62, respectively. The magnet members 60, 62 are connected by shafts 64 and 66 to a bearing member 70 which has a ring passage 72 similar to the convex ring 54 through which the auxiliary shaft 36' passes.

In operation, when the magnet 56 is energized, the magnet member 60 is attracted to the left causing the auxiliary shaft 36' to be canted to the right, FIG. 4. The friction wheel 34' is urged into contact with the side wall 21' and causes the auxiliary shaft 36' to rotate. When the magnet 56 is deenergized and the magnet 58 energized, the friction wheel 34' is urged into contact with the side wall 20', FIG. 3, and the auxiliary shaft 36' caused to rotate in the opposite direction. The auxiliary shaft is normally urged into a central disengaged position by a spring (not shown).

A cone-shaped friction wheel 80 is adapted for use with a wheel 82 having a pair of sloping side walls 84 and 86. The friction wheel 80 is mounted on an auxiliary take-off drive shaft 88, FIG. 5.

The take-off drive shaft 88 passes through an enlarged aperture in a housing 11". The friction wheel 80 is engaged with the left side wall 84 or right side wall 86 by means of a lever 101 having a bearing 102 through which the shaft 88 passes. The lever 101 has a control member 103 disposed on one side of the shaft 88 and on the other side of the shaft 88 is pivotally mounted to the housing 11" by a pin 104. The control member 103 is adapted to receive a cable 106 through apertures 108 therein.

The cable 106 pivots the lever 101 about the pin 104 to cause the engagement of the friction wheel 80 with either the left 84 or right 86 sidewall of the wheel 82. The lever 101 may be magnetically controlled by magnets acting on a ferromagnetic portion of the lever 101 such as the control member 103.

Although minor modifications might be suggested by those versed in the art, it should be understood that I wish to embody within the scope of the patent warranted hereon all such embodiments as reasonably and properly come within the scope of my contribution to the art.

I claim as my invention:

1. A variable direction transmission comprising a drive wheel means having first and second annular side walls spaced from each other to define a space therebetween, a driven wheel means in said space, said driven wheel means having a friction wheel attached to an axle, said drive wheel means and said friction wheel being enclosed in a housing, said housing having an opening therethrough, said opening having a bearing means therein, said axle extending through said opening and through said bearing means, so that a portion of said axle is within said housing and a portion is without said housing, a pair of spaced electromagnets outside of said housing, said pair of electromagnets adapted to act upon said portion of said axle outside of said enclosure to pivot said axle about said bearing and thereby move said friction wheel into and out of engagement with said first and second side walls whereby the direction of rotation of said driven wheel means is reversed.

2. A variable direction transmission according to claim 1 wherein said bearing means includes two sets of ball bearings supporting a convex ring, said convex ring engaging said rotating axle.

3. A variable direction transmission according to claim 2 wherein said axle is surrounded by a ring passage at a point outside of said housing, a pair of spacer members having one end connected to said ring passage and having a magnet member on their opposite end, one of said magnet members each being adjacent one of said spaced electromagnets.

References Cited

UNITED STATES PATENTS

| 751,878 | 2/1904 | Spangler | 74—202 |
|---|---|---|---|
| 1,424,027 | 7/1922 | Murphy | 74—202 |
| 2,468,453 | 4/1949 | Mallentjer | 74—202 XR |
| 804,421 | 11/1905 | Marble et al. | 74—194 XR |
| 869,882 | 11/1907 | Dearing | 74—194 |

FOREIGN PATENTS 578,048    6/1946    Great Britain.

JAMES A. WONG, Primary Examiner

U.S. Cl. X.R.

74—194, 210